July 2, 1929.  F. N. CAMPBELL ET AL  1,719,588
PROCESS OF SEVERING GLASS OR THE LIKE
Filed Nov. 27, 1926  4 Sheets-Sheet 1
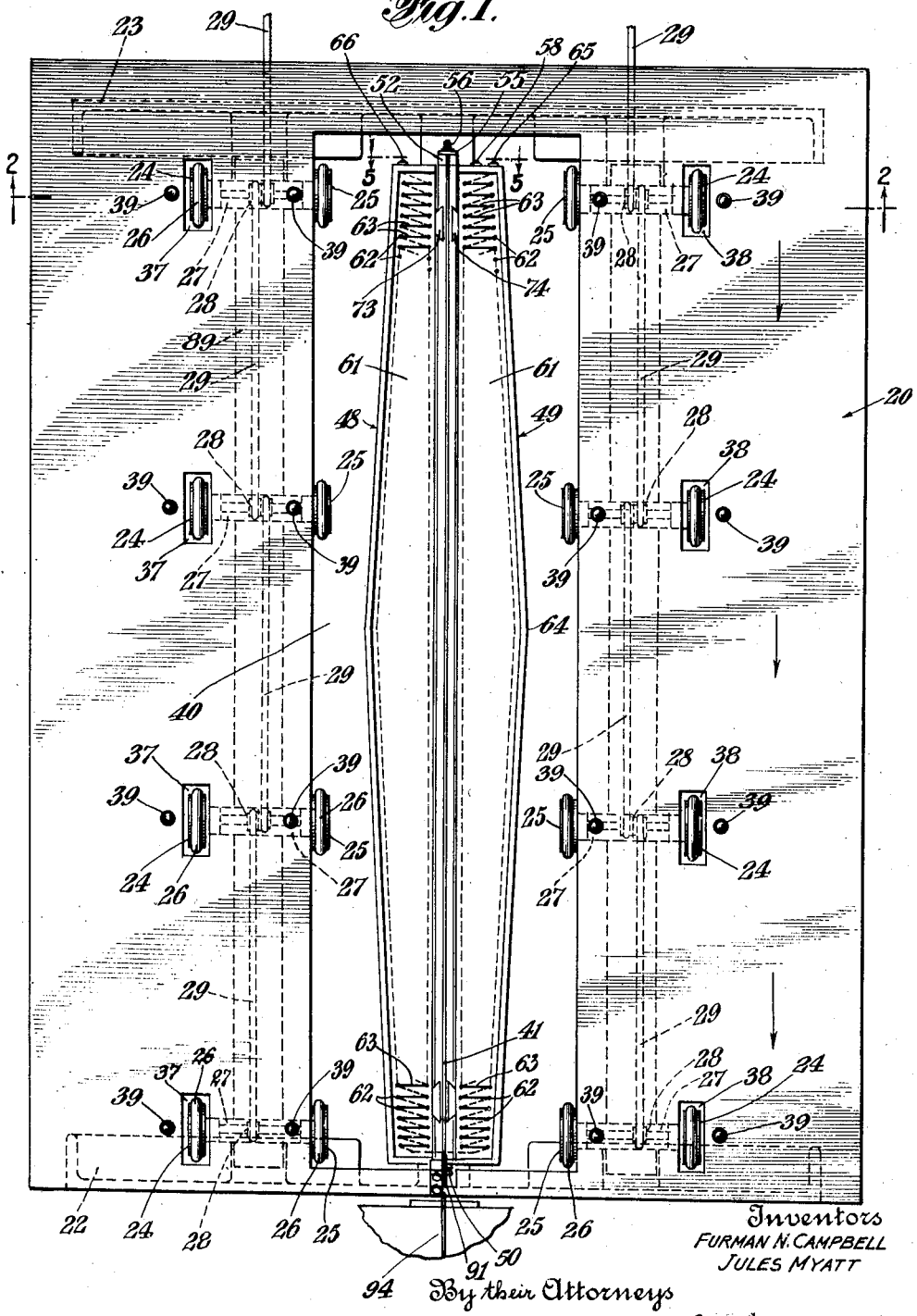
Inventors
FURMAN N. CAMPBELL
JULES MYATT
By their Attorneys
Ward, Crosby & Smith

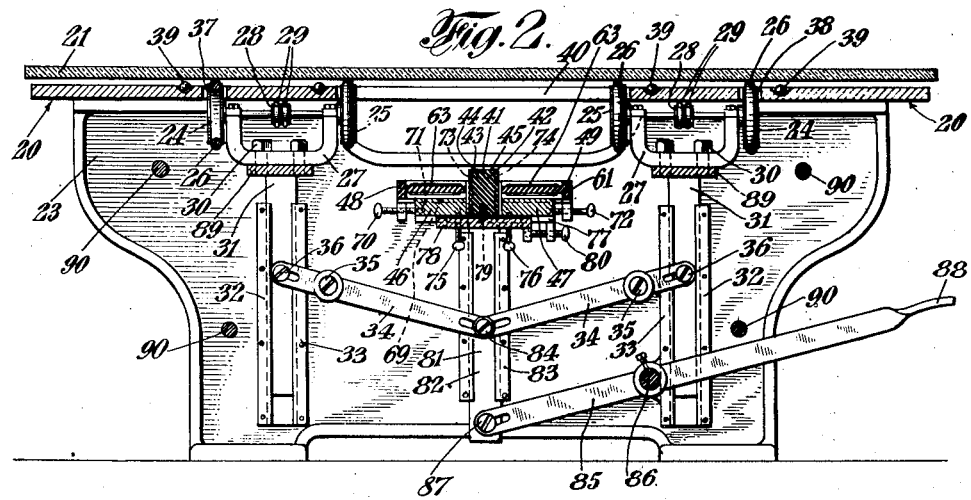
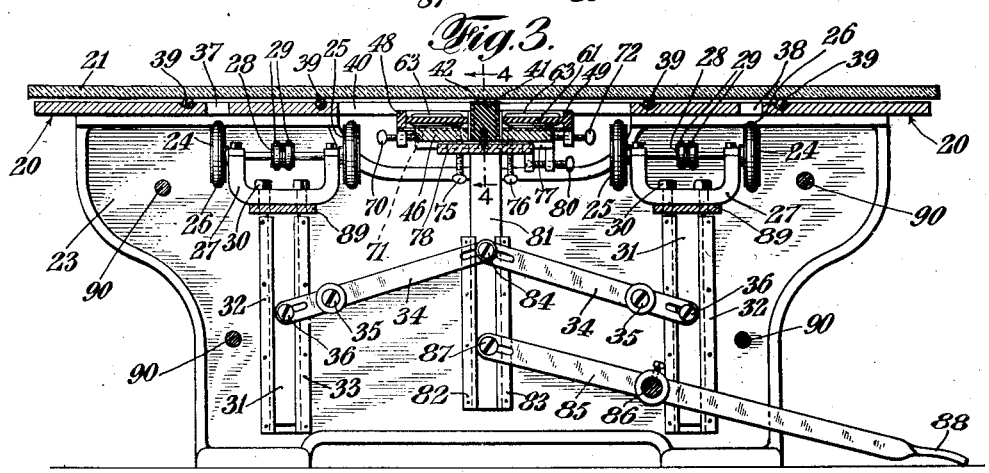
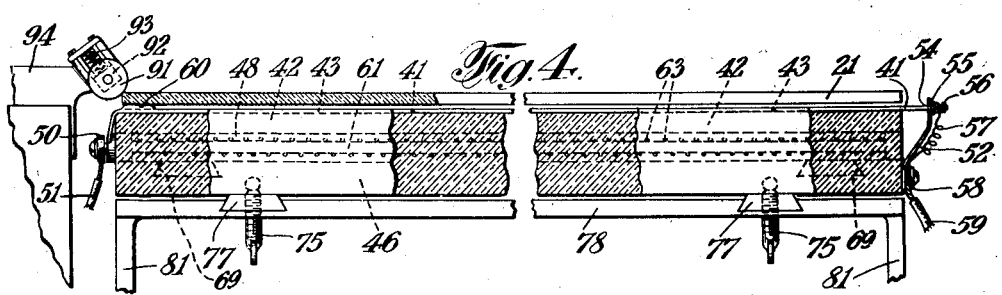
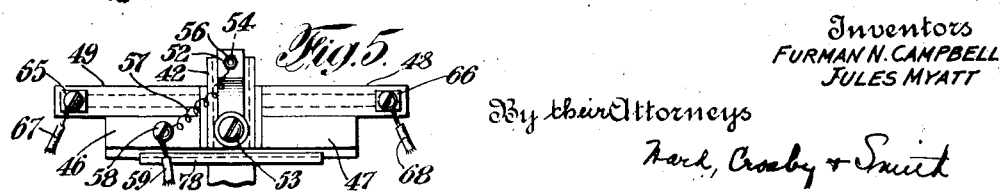
Inventors
FURMAN N. CAMPBELL
JULES MYATT
By their Attorneys

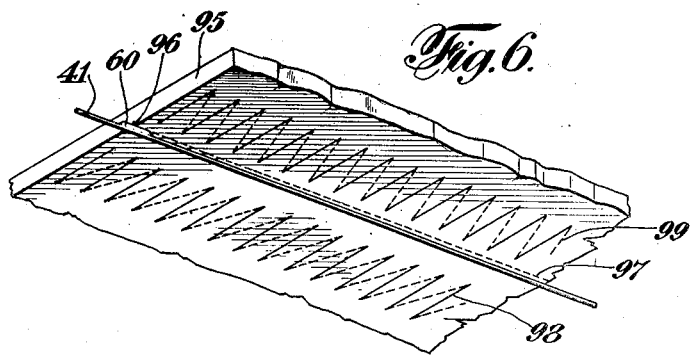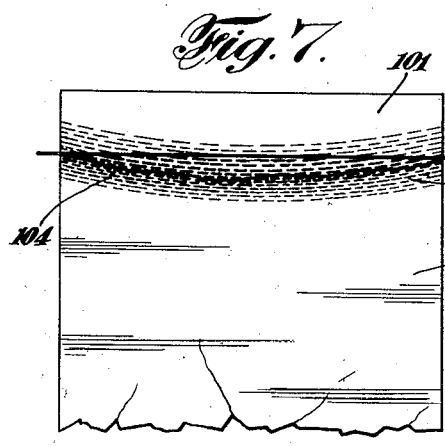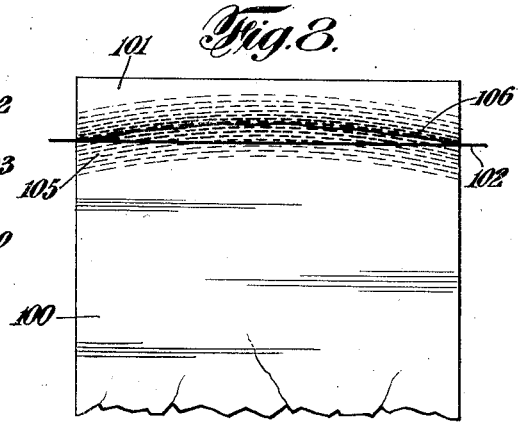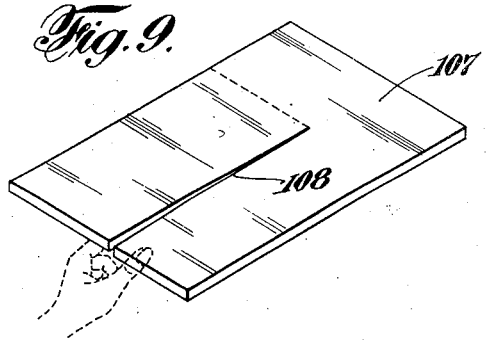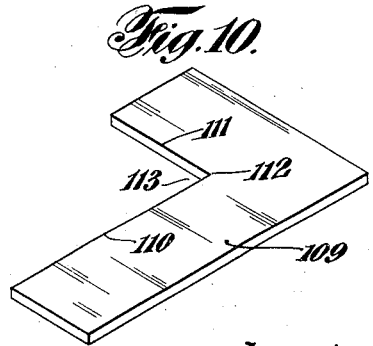

July 2, 1929.   F. N. CAMPBELL ET AL   1,719,588
PROCESS OF SEVERING GLASS OR THE LIKE
Filed Nov. 27, 1926    4 Sheets-Sheet 4
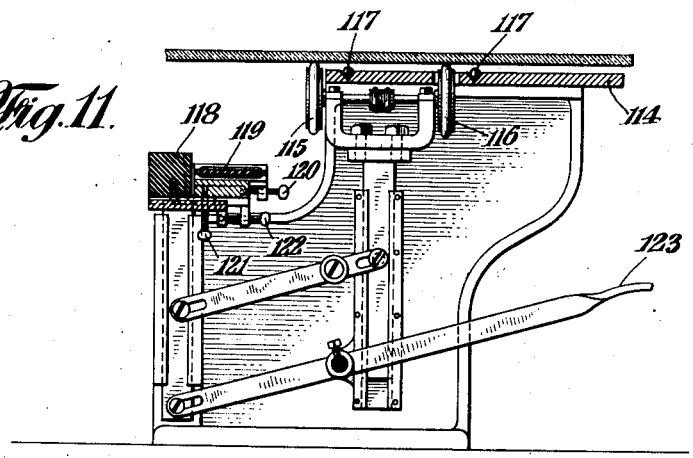
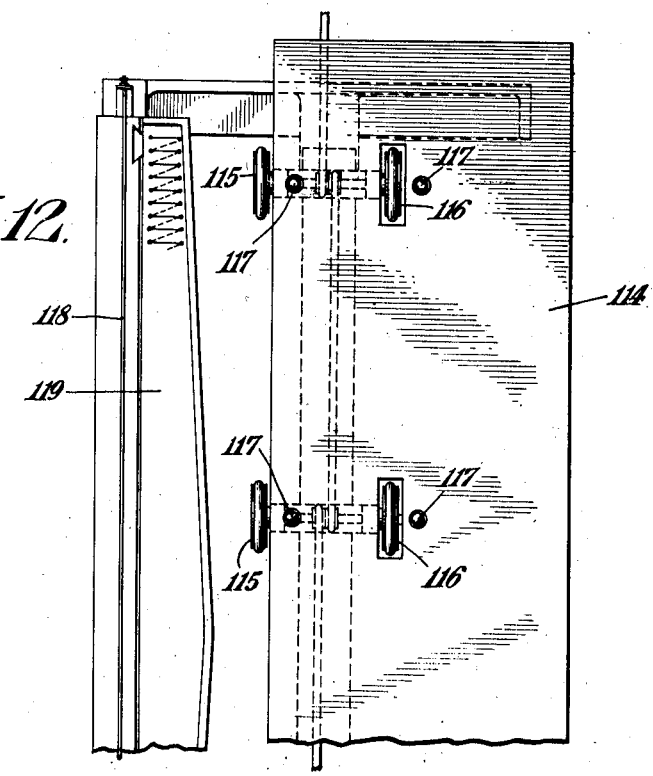

Patented July 2, 1929.

1,719,588

UNITED STATES PATENT OFFICE.

FURMAN N. CAMPBELL, OF NEW HAVEN, AND JULES MYATT, OF EAST HAVEN, CONNECTICUT, ASSIGNORS TO BESSIE L. GREGG, OF FOREST HILL GARDENS, NEW YORK.

PROCESS OF SEVERING GLASS OR THE LIKE.

Application filed November 27, 1926. Serial No. 151,225.

This invention relates to a process of severing materials such as sheets of glass or the like.

The "cutting" of glass heretofore has been a cumbersome and uncertain process. In fact, authorities in the art of glass manufacturing have heretofore assumed and asserted that plate glass and sheet glass cannot be cut commercially by any machine operation (see commercial text book on glass, etc., page 195, published in 1923 by Pittsburgh Plate Glass Company). Nevertheless, we have in our present invention provided a process of severing glass along a defined line by applying heat to the zone of such line and controlling the distribution of such heat, and other conditions, in a manner whereby controlled expansion takes place and the glass is accurately severed at the desired line. We have found it satisfactory and convenient to apply such heat by bringing a hot object or objects or elements, heated electrically or otherwise, into contact with or into close proximity of the glass, but if desired, according to certain phases of the invention, heat may be provided by the combustion of oxidizable material placed along the line of cleavage, or by other suitable chemical action. On the other hand, in certain instances the required temperature difference may also be established by applying refrigerating means to the zone of cutting or certain areas thereof which may be thus cooled to a temperature substantially different from the main body of the glass.

We have found it preferable to provide suitable means for supporting or suspending the glass, and in a manner such as to permit unrestrained separation of the glass parts when being severed, the heat being applied along the desired line either along the under side or the upper side of the glass at the line of cleavage.

In order to quickly initiate the severing action, a nick or fault or other weakened portion may be provided at a point on the line of cleavage where the severing action is to start. Such weakened portion may be formed during the manufacture of the glass, by melting with a heated element, or mechanically by suitable abrasive or cutting means.

Furthermore, although it has heretofore been practically impossible to cut, split or sever glass along an irregular or curved line without destroying or breaking away at least one of the severed parts, the process embodying our invention is applicable for use in cutting glass part way across or entirely across, along a straight line, a curved line, or a line including sharp angular bends. In such instances, the cracking action is controlled and limited to the desired lines so that both the severed parts may be used either with or without further cutting.

We are aware that attempts have heretofore been made to break or melt apart hot glass of tubular form by applying a wire to the desired breaking point and thereafter electrically heating such wire in order to either melt through or break the glass by the resulting expansion accompanied by bending forces. However, in such attempts no provision has been made for the control of the distribution of heat at the zone of cutting and therefore even for tubular glass members the process was uncertain, inaccurate and time-consuming, and could not be extended to the problem of cutting flat glass or cold hardened glass in other shapes, since the glass would be shattered and the cracking would be out of control.

The objects of this invention include the provision of a dependable, relatively simple and convenient process for the purposes above referred to. The invention comprises the novel process and steps of the process embodied by way of example in the procedure hereinafter described as illustrating a preferred embodiment of our invention. Further objects, features and advantages of the invention will more clearly appear from the detailed description given below taken in connection with the accompanying drawings which form a part of this specification.

In the drawings, Fig. 1 illustrates in plan view one form of machine for splitting glass by the process embodying our invention;

Figs. 2 and 3 are sectional elevational views taken substantially along the line 2—2 of Fig. 1 and illustrating the parts of the machine in two different operating positions;

Fig. 4 is a sectional view taken substantially along the line 4—4 of Fig. 3;

Fig. 5 is a sectional view taken substantially along the line 5—5 of Fig. 1;

Fig. 6 is a diagrammatic illustration indicating the manner of performing our process;

Figs. 7 and 8 are diagrammatic illustrations indicating the results of improper temperature control during the cutting operation;

Figs. 9 and 10 show pieces of glass cut by our process and are illustrative of certain particular applications of the process;

Fig. 11 is a sectional elevational view of another form of machine for severing glass by the process embodying our invention; and Fig. 12 is a plan view of part of the machine shown in Fig. 11.

Referring to the drawings, the particular machines there shown for carrying out our process will now be described. A suitable supporting means such as a table is indicated at 20 upon which an extended area of glass as at 21 may be horizontally supported. The table may be provided at each end with supporting frames as at 22 and 23. The glass may be moved on to the table in proper position for cutting, either manually or automatically and to facilitate such handling a plurality of pairs of conveyor rollers as at 24 and 25 may be provided. As shown, the rollers may be provided with rubber peripheries as at 26 for contacting with the glass and may be mounted in pairs on suitable bearing yokes as at 27. If desired, the rollers may be driven from a suitable source of power, pulleys being provided as at 28 adapted to be rotated by suitable belts 29. With the machine shown, provision is made for cutting the glass along a line coinciding with the center portion of the machine, the conveyor rollers 24 and 25 being arranged at spaced points along each side of the zone of cutting. The yoke 27 of each pair of conveyor rollers may be secured as by bolts 30 to a member 31, which in turn is vertically slidable along the table supporting end frame between suitable guide members as at 32 and 33.

The conveyor rollers, together with the yokes 27 and slidable members 31, are movable vertically by the operation of lever members as at 34 pivotally mounted as at 35 upon the table end frame members and having pivotal and slidable engagement as at 36 with the members 31. The mechanism for operating the levers 34 will be hereinafter described. The table 20 may have suitable apertures as at 37 and 38 to permit the up and down movement of the conveyor rollers. When an area of glass is to be moved on to the supporting table, the conveyor rollers are normally in their elevated positions for contact with the glass. However, after the glass is in the desired position for cutting, the conveyor rollers may be lowered out of contact with the glass, thus bringing the glass into contact with a plurality of spaced anti-friction supporting devices as at 39. These anti-friction devices have been found desirable for the purpose of permitting unrestrained separation of the glass parts when being severed and may take the form either of rounded metallic surfaces over which the glass slides easily or may be in the form of rotatable balls positioned at spaced points along the table top.

The table top may be formed with a gap 40 of extended area beneath which means may be mounted for applying and controlling the heat for effecting the severing operation. An electrically heated element or object such as a length of nichrome wire or a metallic resistance member 41 may be mounted on a strip of insulation material 42 which is formed with a groove 43 for receiving the wire along the middle of its upper edge. At each side of the groove shoulders 44 and 45 are provided on the insulation strip for assisting in the support of the severed edges of the glass and for preventing excessive sagging thereof during the severing operation. Such shoulder portions are of particular value for supporting narrow strips of glass which do not fully extend over the table. At its lower edge the strip of insulation 42 extends between a pair of shoulder members 46 and 47 for respectively supporting heating plates 48 and 49 as hereinafter more fully described.

The heated wire 41 as indicated in Fig. 4 may be secured at one end to a binding post 50 and connected with a lead 51 for extending to a current source. At its other end the wire may be secured to a spring member 52 for holding the wire straight and under tension when heated. The spring member 52 may be mounted on the strip of insulation 42 and secured by suitable clamping means 53 (see Fig. 5). The spring member 52 may be formed with a suitable aperture 54 for receiving a heat insulating bushing such as a glass bead 55 through which the wire 41 is threaded. At its end the wire 41 may be provided with suitable clamping means 56 electrically connected by the wire 57 to a binding screw and terminal 58. A lead wire 59 is provided for cooperating with the lead wire 51 in conducting the desired electrical power to the wire 41. The insulation bushing 55 protects and separates from the hot wire the tempered spring member 52.

In the particular example of the apparatus shown in Fig. 4, the hot wire 41 as received in the groove 43, although brought into close proximity of the under side of the glass, is retained throughout the greater portion of its length in a position spaced slightly from contact with the glass. However, at least one point, preferably at its end, the wire 41 may be so positioned or formed with an enlargement as at 60 for contacting directly with the glass at a point near where it is desired to initiate the severing action, the remainder of the wire extending along near and directly beneath the desired line of cleavage, although such spacing is not essential. It is believed that when an attempt is made to bring the wire into direct contact with the glass along the entire line of cleavage, such contacting is liable to be more or less irregular and at the points of direct and firm contact an excess of heat will be admitted to the glass, whereas at points of uncertain contact, not enough heat will be admitted to insure the desired uniformity of heating and the proper severing action.

The heating plates 48 and 49 are preferably adjustably mounted to be separately movable and also movable with the heated wire 41 so that such plates may be brought into a desired spaced relation with the glass along the line of cleavage. Each of the heating plates may comprise a sheet of insulating material as at 61 (see Fig. 1) perforated as at 62 in order to receive an electrical resistance wire 63 threaded through the perforations. In the example shown in Fig. 1, the perforations are so spaced that at the upper side of the heating plates, strands of the heated resistance wire will extend in closely spaced relation along lines substantially perpendicular to the hot wire 41, which arrangement gives highly satisfactory results. Along the center of the machine as at 64 the heating plates are shown as being made substantially wider than at the ends of the machine, the width gradually tapering toward each end. At the edges of the glass it is under some circumstances apparently necessary to apply less heat than is necessary at the center portions of an extended area of glass to properly control the expansion of the glass along the cutting line, and accordingly the tapered shape of the heating plates has been found to satisfactorily fulfill such requirements. The resistance wires of the two heating plates may be connected in series if desired with the terminals attached to binding screws as at 65 and 66 (see Fig. 5) for engagement respectively with lead wires 67 and 68 extending to any suitable source of electrical current.

To provide for the desired lateral adjustment of the heating plate 48, the heating plate member and the shoulder portion 46 may be formed with cooperating guide-ways as 69 by which the heating plate 48 is secured to its shoulder portion 46 but is horizontally slidable in respect thereto. The heating plate may be adjusted and fixed in the desired position by turning a thumb screw 70 rotatably secured at 71 to the shoulder portion 46. The heating plate 49 may be mounted in a manner similar to heating plate 48 and provided with an adjusting thumb screw 72. In order to provide for movement of the heating plates 48 and 49 vertically in respect to the heating wire 41, the shoulder members 46 and 47 and the insulating strip 42 may be formed with cooperating slidable guide portions as at 73 and 74. The elevation of the shoulder portions 46 and 47 may be adjusted by means of thumb screws 75 and 76 which are in threaded engagement with a carriage member 77. The carriage member 77 in turn is slidable laterally in respect to a supporting member 78 whereby both heating plates 48 and 49, together with the heating wire 41, may be moved laterally in respect to the glass. The insulation strip 42 may be secured to the carriage member 77 by suitable screws as at 79. The lateral position of the carriage member 77 may be adjusted and affixed by a thumb screw as at 80. It will be understood that the supporting member 78 is formed with appropriate slots as indicated by dotted lines, permitting free lateral movement of the thumb screws 75 and 76.

The relative arrangement and dimensions of the wire 41 and the heating plates 48 and 49 and parts thereof will depend to a certain extent upon the character and thickness of the glass or other material which is to be severed. For example, in some instances it may be found desirable to mount the heating plates in a position where they will come into a closer relationship with the glass than is indicated in the drawings in order to heat a limited area to a higher temperature. In other cases a more extended area may be heated by moving the plates to a position further away from the glass and further away from the wire 41. The extent of the heating may be further adjusted or varied by adjusting the current supplied. That is, various voltages may be applied to the terminals 65 and 66 depending upon the desired heating effects. The desired uniformity of heating at various points along the line of cleavage may be secured by properly spacing the perpendicular lengths of resistance wire 63. It may also be found desirable to vary the temperature of the hot wire 41 as by adjusting the voltage of the source of current supply. For example, in splitting extended areas of glass, a relatively low temperature is desirable. In such cases we prefer to heat the wire quite hot but only to a degree such that illumination is substantially absent. However, for relatively narrow strips or for thinner glass the wire should be heated to a cherry red and if the glass is to be severed along its edge or a narrow strip is to be trimmed off, we have found it desirable to heat the wire red hot. The proper temperature for the wire, however, will vary within wide limits not only because of variations in different forms and types of glass but because of constructional features or details of the wire supporting strip and other parts of the machine, and accordingly applicants do not desire to be limited to particular wire temperatures such as above indicated.

The supporting member 78 may be mounted upon or formed integrally with a vertically slidable member 81 received between guide strips 82 and 83. The conveyor roller operating levers 34 may be pivotally and slidably connected as at 84 to the member 81. An operating lever 85 may be pivotally mounted upon a rock shaft 86 and pivotally and slidably connected at 87 to the slidable member 81. The lever 85 may be extended to an accessible location to provide a foot pedal 88. When the foot pedal 88 is depressed, the slidable member 81 together with the hot wire 41 and the heating plates 48 and 49 are elevated within the gap 40 in the table and into close proximity of the under side of the glass which is to be severed. Simultaneously by reason of the operating levers 34, the slidable members 31, together with the conveyor rollers, are lowered out of contact and supporting relation with the glass to bring the glass into contact with the anti-friction supporting devices 39.

The rock shaft 86 may extend from the table supporting frame 23 to the supporting frame 22. It will be understood that the supporting frame 22 may be provided with operating levers and slidable supporting means for the conveyor rollers, the heating plates and the hot wire, similar to the arrangement mounted upon the frame member 23 and operated by the rock shaft 86. The slidable members 31 at their upper ends may be provided with a horizontally extending bar as at 89 extending the length of the table for interconnecting the slidable members 31 at each of the frames 22 and 23. The supporting member 78 if desired may likewise be extended for interconnecting the slidable members 81. The frame members 22 and 23 may be retained in proper relationship by connecting rods as at 90.

In order to form the desired fault or nick at the line of cleavage, means may be provided for this purpose for engaging the glass either at its upper edge or its lower edge, at the time the glass is moved into cutting position upon the table. For example, as indicated in Fig. 4, a hardened steel cutting wheel 91 may be pivotally mounted in a slidable bearing 92 which bearing is pressed downwardly by a spring 93 so as to bring the cutting wheel into firm but yielding contact with the edge of the glass at the desired line of cleavage when the glass is moved into cutting position. Contact with successive pieces of glass will cause the cutting wheel 91 to turn periodically to bring fresh cutting edge portions into operating position. The bearing 92 if desired may be supported upon a partition member 94 which retains the two severed portions of glass in spaced relation, as the same are moved off the table 20.

A piece of glass 95 is indicated in Fig. 6 provided with a nicked or weakened portion 96 formed at its lower edge by a suitable cutting wheel or other means.

Fig. 6 serves to further illustrate the relative arrangements of the various heating elements. The desired line of cleavage is indicated at 97. The heated cutting wire 41 extends along beneath this line in spaced relation thereto. The enlargement or extension 60 on the cutting wire 41 contacts directly with the glass adjacent nick 96 and insures the desired prompt starting of the cutting action. Wire heating elements are indicated at 98 and 99 respectively at each side of the wire 41 and have their active heating portions running perpendicular to the wire 41 and in spaced relation to the glass. These active portions are indicated by the full lines, whereas the inactive portions, which extend along beneath the insulation supports of the heating plates, are indicated by dotted lines.

In operating the machine the heating plates and the hot wire are first adjusted to obtain the proper results with the particular kind of glass to be cut. The proper adjustments may be determined either by a cut-and-try method or by reference to prior experience with the machine. The glass to be cut is then brought into the desired position on the table and when properly positioned the nick or weakened portion is formed in the manner above described. When the operator applies pressure to the pedal 88, the heated elements are brought into active position and at the same time the conveyor rollers are lowered so that the glass rests upon the anti-friction supporting devices. Within a few seconds the glass severing action will start at the weakened portion and rapidly and accurately proceed along the desired line of cleavage. During the severing action, and also thereafter, the severed edges will rest upon the shoulder portions 44 and 45 and will be prevented from excessive sagging and from dropping through the gap in the table. At the same time by reason of the gap in the table the zone of cutting will be very effectively insulated from contact with heat conductive or absorptive objects.

When a heated wire is applied along a desired line of cleavage on an extended area of glass and no particular provision is made for controlling the distribution of heat along the zone of such line, the severing action if it occurs, will not be under the operator's control and will not ordinarily follow the desired line. By providing heating plates as above described, however, the heat radiation within and along the glass may be readily controlled and the areas of glass each side of the cutting line may be heated substantially equally when it is desired to split an extended area of glass through its mid portion. Additional problems arise however, when it is desired to trim a narrow strip from the edge of an extended area of glass or when it is desired to split a narrow strip of glass. Because of the conditions prevailing at the edge of a large area of glass, we have found it usually necessary to provide but one heating plate positioned at the side of the cutting wire opposite from the edge. Considerable care must be exercised in selecting a proper form and position for such single heating plate. If an excess of heat is applied, the glass in most cases will not be severed along the desired line of cleavage and along the heated cutting wire. Instead a more or less irregular cracking will occur usually following a curved line at the side of the cutting wire opposite from the edge. For example, in Fig. 7 a piece of glass is indicated at 100 having an edge portion 101 which is to be trimmed off. A hot wire 102 is placed along the desired line of cleavage. If a heating plate is brought into proximity of the cutting zone at the side of the hot wire opposite from the glass edge, a heated zone such as roughly indicated by the dotted lines 103 will be established if the heating is excessive or is applied too rapidly. In that case the glass will usually be severed along a more or less irregular line 104 curved inwardly of the sheet of glass in respect to the hot wire. Again, if a heating plate is brought into proximity of the zone of cutting at the side of the cutting wire opposite from the glass edge, and such plate provides an insufficient quantity of heat, a heated zone will be established apparently more nearly following the zone indicated by the dotted lines 105 of Fig. 8. In this case the glass will usually be severed along a more or less irregular line, such as indicated at 106 which line is generally curved outwardly in respect to the hot wire on the sheet of glass. In each of these instances it will be noted that the line of expansion where breaking occurs does not extend along the hot cutting wire, but apparently follows approximately the center of the field or zone of expansion. When an intermediate proper temperature is applied with a suitable heating plate, the line of severing will follow accurately the hot wire at the desired line of cleavage.

As above stated, our process is also applicable to the cutting of an area of glass part way across only and along a predetermined line of cleavage. For example, in Fig. 9 a piece of glass 107 is indicated split part way across as at 108. This may be accomplished by the use of a machine more particularly adapted for such purpose, or if desired the machine above described may be used merely by allowing the heated wire to be coextensive only with the desired line of cleavage. Either by a single operation or by a succession of operations in which the glass is split part way across, one may split in twain an area of glass in such a way as to remove an angular piece therefrom. For example, for special purposes sharp angular pieces may be cut from the glass without splitting the glass beyond the vertex of the angle, since according to our process the splitting may be limited to the particular outline desired. As shown in Fig. 10, a piece of glass 109 may be severed along lines 110 and 111 without splitting the glass beyond the vertex of the angle formed at 112. The angular piece which filled the area 113 may by our process be removed as an integral piece available for any desired use.

In Figs. 11 and 12 a machine designed particularly for trimming the edges of glass is illustrated. A table 114 is provided for supporting the glass and may be equipped with conveyor rollers as at 115 and 116 and anti-friction supporting devices as at 117 similar to the corresponding parts in the machine above described. A heated wire is indicated at 118 and may be accompanied by a single heating plate 119. The wire 118 and the heating plate 119 may be provided with adjustable and vertically movable supporting means constructed in substantially the same manner as in the machine above described, but omitting one of the heating plates and accompanying parts. As indicated in Fig. 11, the heating plate 119 may be laterally and independently adjusted by a thumb screw 120 and vertically adjusted by a thumb screw 121. The heating plate, together with the hot wire 118, may be adjusted laterally as a unit by the thumb screw 122. The heating elements may be raised and lowered by operating a foot pedal 123 with the associated connecting members similar in construction to the foot pedal 88 above described and its associated parts. The parts which are not herein specifically described in connection with the machine of Figs. 11 and 12 may be constructed substantially according to the corresponding parts of the machine shown in Figs. 1–5.

Apparatus for carrying out our process is claimed in our copending application, Ser. No. 151,224, filed November 27, 1926, and entitled "Apparatus for severing glass or the like".

While we have described our invention in considerable detail with respect to the preferred methods or processes for performing the same, it will be understood by those skilled in the art after understanding our invention, that various changes and modifications may be made without departing from the spirit and scope of the invention and we aim in the appended claims to cover all such modifications and changes as come within the spirit of the invention.

What we claim as new and desire to secure by Letters Patent of the United States is:

1. Process of severing glass or the like along a defined line of cleavage which comprises forming a nick in the glass at said line and placing a heated object along said line, said object being in contact with the glass adjacent said nick and spaced a short distance therefrom at other points along said line.

2. Process of splitting an area of glass along a defined line which comprises expanding the glass by heat at said line and controlling the resulting expansion of glass adjacent said line.

3. In a process of splitting hardened glass, the method of controlling the expansion of glass over areas of substantial width which comprises applying thereto a controlled, continuing but limited amount of heat insufficient to cause softening of the glass.

4. Process of splitting hardened glass or the like which comprises placing a heated element along the desired line of separation, and establishing a heated zone extending along the glass substantially equally to each side of said line, said zone being of a width greater than the width of the area which is substantially heated by said element at the line of separation.

5. Process of splitting flat glass or the like along a predetermined line of cleavage which comprises placing an electrically heated conductor along said line having a temperature when applied such as to effect controlled splitting, the major portion of the length of conductor being spaced a short distance from the glass.

6. Process of splitting flat glass or the like along a predetermined line of cleavage which comprises placing an electrically heated conductor along said line having a temperature when applied such as to effect controlled splitting, the conductor contacting with the glass at least at one point and other portions of the length of conductor being spaced a short distance from the glass.

7. Process of splitting sheet glass or the like at a predetermined line of cleavage which comprises supporting the glass with the area adjacent said line insulated from objects which are effectively conductive or absorptive of heat, warming the surface of the glass over an area including said line, and subjecting the glass at said line to a temperature, substantially uniform and continuous along the line and different from that of the remainder of said area and such that controlled splitting occurs, said warmed area extending substantially beyond the area directly heated by the application of heat at said line.

8. Process of splitting sheet glass or the like at a predetermined line of cleavage which comprises supporting the glass at points spaced from said line, the area adjacent said line being suspended out of contact with heat conductive or absorptive bodies, warming the surface of the glass over an area including said line, and placing an electrically heated conductor along said line having a temperature such as to effect controlled splitting, the temperature of said warmed area being controlled independently of said conductor.

9. Process of splitting glass or the like along a predetermined line of cleavage which comprises supporting the glass at points spaced from said line, the area adjacent said line being suspended out of contact with heat conductive or absorptive bodies, placing an electrically heated conductor along said line having a temperature such as to effect controlled splitting, and providing means immediately below and along said line to support the cleaved edges to prevent substantial sagging thereof during the splitting operation.

10. Process of splitting glass or the like along a predetermined line of cleavage which comprises supporting the glass at points spaced from said line, the area adjacent said line being suspended out of contact with heat conductive or absorptive bodies, subjecting the glass along said line to a temperature different from that of the remainder of the glass and such that controlled splitting occurs, and providing means immediately below and along said line to support the cleaved edges to prevent substantial sagging thereof during the splitting operation.

11. Process of severing silicious sheet material or the like which comprises establishing a heated limited zone on the glass surface including the desired line of separation and subjecting the material at said line to a different temperature whereby the resulting controlled expansion causes splitting of the material along said line, said zone being wider than the area heated incidentally to the application of the heat at said line.

12. Process of severing glass or the like which comprises forming a fault in the glass at a point on the desired line of separation, establishing a heated zone including said line, and subjecting the material at said line to a required different temperature controlled independently of the heating of said zone whereby the resulting controlled expansion causes severance of the material along said line.

13. Process of severing glass or the like which comprises placing a heated element along the desired line of separation, and providing additional heating means along the zone of said line for controlling the radiation within the glass of heat from said element.

14. Process of severing glass or the like which comprises placing a heated wire along the desired line of separation, and also controlling the radiation within the glass of heat from said wire by heating the areas beside said line by placing heated wires spaced from the glass and running perpendicular to said first named wire.

15. Process of severing glass or the like which comprises subjecting the desired line of separation to a desired temperature and subjecting the areas adjacent said line to a different temperature by applying heat along spaced lines perpendicular to said line of separation.

16. Process of severing an extended sheet of glass which comprises subjecting the desired line of separation to the required temperature, and heating the areas adjacent said line to a lesser temperature by applying heat along lines perpendicular to said line of separation, such areas as heated near the edges of the glass being narrower than at other points along the line of separation.

17. Process of severing an extended sheet of glass which comprises subjecting the desired line of separation to a desired temperature, and heating the areas adjacent said line to a lesser temperature, the heated areas near the ends of the line being narrower than at other points along the line of separation.

18. Process of severing glass or the like which comprises forming a fault in the glass at a point on the desired line of separation, subjecting the desired line of separation to a predetermined temperature, and heating the areas adjacent said line to a different temperature, such areas as heated near the edges of the glass at the ends of the line being narrower than at other points along the line of separation.

19. Process of severing an extended sheet of glass which comprises subjecting the desired line of separation to a predetermined temperature, and heating to a different degree the areas adjacent said line, less heat being applied to such areas near the edges of the glass than to other areas along the line of separation.

20. Process of severing an extended sheet of glass which comprises subjecting the desired line of separation to a high temperature, and heating the areas adjacent said line to a lesser temperature by heated elements substantially spaced from the glass and running perpendicular to said line of separation.

21. Process of splitting glass or the like along a predetermined line of cleavage which comprises mounting the glass on anti-friction supporting means to permit unrestrained separation of the glass parts when being severed, and subjecting the glass along said line to a temperature different from that of the remainder of the glass and such that controlled splitting occurs.

22. Process of splitting sheet glass or the like along a predetermined line of cleavage which comprises supporting the glass on anti-friction devices to permit unrestrained separation of the glass parts when being severed and with the areas adjacent said line insulated from objects which are effectively conductive or absorptive of heat, and subjecting the glass along said line to a temperature different from that of the remainder of the glass and such that controlled splitting occurs.

23. Process of severing glass or the like along a predetermined line which comprises supporting the glass at points spaced from said line, forming a fault in the edge of the glass at said line, bringing a heated wire into close proximity of the under side of the glass and along said line, and providing additional heating means along the zone of said line for controlling the radiation within the glass of heat from said wire.

24. Process of cutting glass comprising establishing a heated zone on the glass, and subjecting the glass along the middle of said zone to a higher temperature such as to cause controlled severing of the glass.

25. Process of severing a sheet of glass at a predetermined line which consists in providing a weak spot in the glass at said line and independently heating zones on the glass surface at both sides of said line respectively whereby the glass is severed along said line.

26. Process of severing glass along a predetermined defined line, which comprises warming the surface of the glass at least over a substantial area including said line, and heating the glass at said line to a temperature higher than that of the remainder of said area, said warming and said heating being independently controllable whereby controlled cracking of the glass occurs at said line.

27. Process of severing glass along a predetermined defined line, which comprises substantially uniformly warming the surface of a substantial area of the glass contiguous to said line, and maintaining the glass at said line at a temperature different from that of the glass immediately adjacent said line, whereby controlled cracking of the glass occurs at said line.

28. Process of severing glass along a predetermined defined line, which comprises warming the surface of the glass at least over a zone including said line, and heating the glass at said line to a temperature sufficient to cause controlled cracking at said line before the interior of the glass of said zone is warmed, said warm area extending substantially beyond the area directly heated by the application of heat at said line.

29. Process of severing glass along a predetermined defined line, which comprises relatively quickly and uniformly heating the surface of the glass at least over a zone contiguous to said line, and applying a higher temperature to the glass contiguous said zone at said line only.

In testimony whereof we have signed our names to this specification.

FURMAN N. CAMPBELL.
JULES MYATT.